United States Patent Office 3,169,548
Patented Feb. 16, 1965

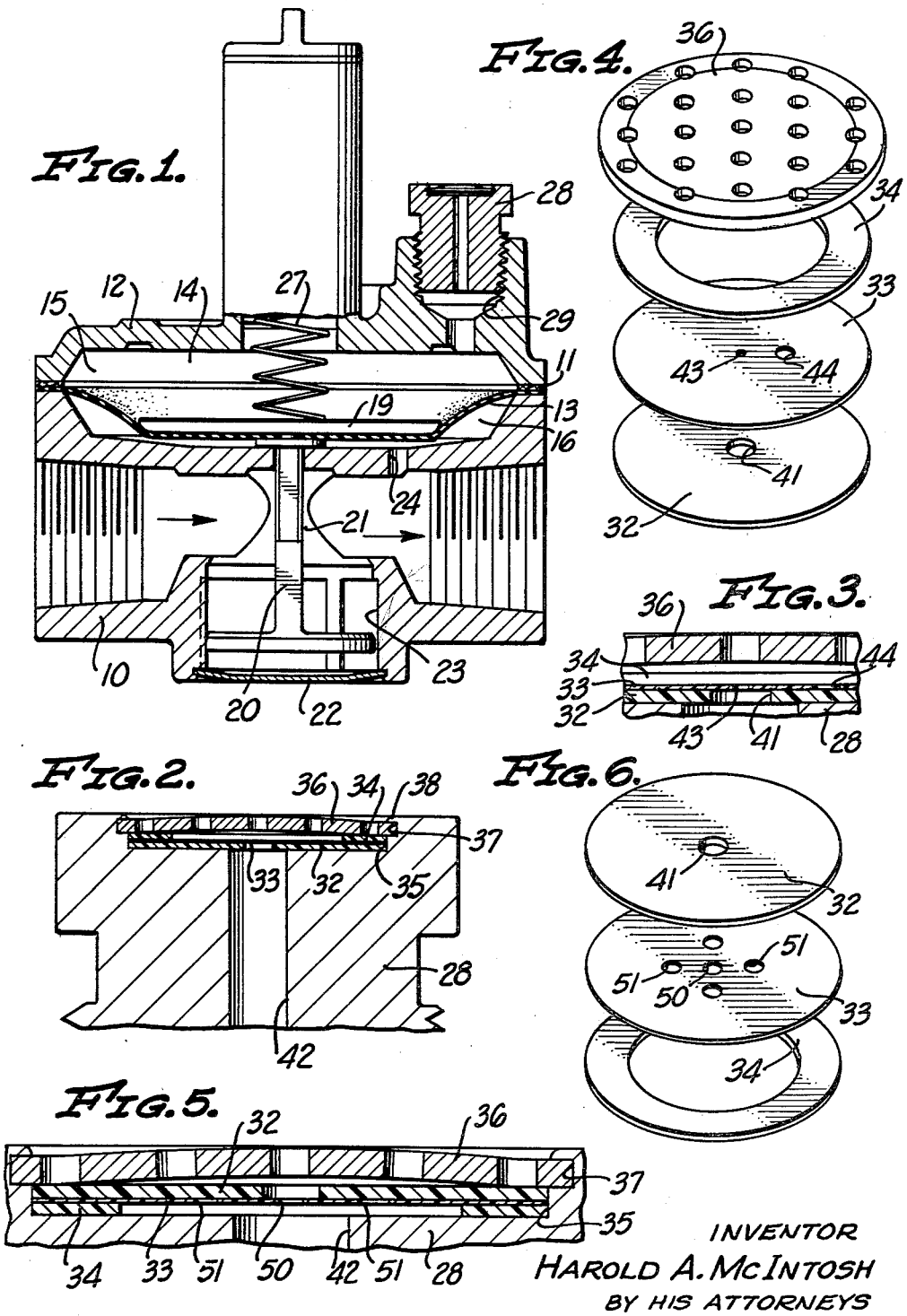

3,169,548
VENT FITTING FOR REGULATOR VALVE
OR THE LIKE
Harold A. McIntosh, South Pasadena, Calif., assignor to Rehrig Pacific Co., Los Angeles, Calif., a corporation of California
Filed Mar. 27, 1962, Ser. No. 182,885
3 Claims. (Cl. 137—513.3)

This invention relates to vent flow control fittings suitable for use with gas regulator valves and the like.

A typical application of the invention is to a diaphragm-type valve such as is shown in the U.S. patent to Kern, No. 2,668,396, and in applicant's copending application, Serial No. 73,588, filed December 5, 1960, now Patent Number 3,120,856.

A conventional diaphragm-type valve includes a housing with a throat section for gas flow therethrough and a valve member slidable in the housing for increasing and reducing the size of the opening through the throat section. The housing also includes a pressure chamber divided into zones by a diaphragm, with the valve member being coupled to the diaphragm. A differential pressure across the diaphragm produces motion of the diaphragm and hence motion of the valve member. The differential pressure may be created by a variety of arrangements. Typically, one zone is coupled to the outlet or exhaust side of the throat section and the other zone is coupled to a reference pressure such as the surrounding atmosphere.

The maximum rate at which a valve can change position may be limited by a restriction in the line coupling the pressure chamber to the atmosphere, which line is ordinarily referred to as the vent.

In some applications of the diaphragm-type valve, it is desirable to have a differential between the maximum opening and closing rates, i.e., to have a fast open, slow close valve or a fast close, slow open valve. It is an object of the present invention to provide a new and improved vent control fitting for providing a differential between opening and closing rates of a diaphragm-actuated valve. A further object is to provide a structure which may be used to obtain a slow opening operation or a fast opening operation as desired. Another object is to provide a structure which can be used to obtain various maximum rates of change of diaphragm position.

It is an object of the invention to provide a new and improved vent flow control fitting which is inexpensive, reliable, durable, and one which produces reproducible rates of change.

It is an object of the invention to provide a vent flow control fitting including a housing, a seat having a flow limiting passage therethrough, a flapper member having a first opening and at least one second opening therethrough, and means for mounting the seat and flapper member together in the housing with the first opening of the flapper member aligned with the passage of the seat so that flow through the fitting in one direction urges the flapper member against the seat closing the second opening and flow in the opposite direction urges the flapper member away from the seat clearing the second opening, with the rate of flow in the one direction controlled by the first opening.

It is an object of the invention to provide a vent flow control fitting for a gas regulator valve or the like providing a differential between opening and closing rates including a housing, a seat member having at least one opening therethrough, a flapper member having at least one opening therethrough, and means for mounting the seat and flapper members together in the housing with an opening of the flapper member aligned with an opening of the seat member so that flow through the fitting in one direction urges the flapper member against the seat member and flow in the opposite direction urges the flapper member away from the seat member, with the rate of flow in the one direction controlled by the aligned openings and with the rate of flow in the other direction controlled by the member with the lower total opening area.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a sectional view through a typical diaphragm actuated regulator valve showing the invention installed thereon;

FIG. 2 is an enlarged partial sectional view of the vent fitting of the regulator of FIG. 1;

FIG. 3 is an enlarged sectional view of a portion of the fitting of FIG. 2;

FIG. 4 is an exploded view of the vent fitting; and

FIGS. 5 and 6 are views corresponding to FIGS. 3 and 4, respectively, showing an alternative form of the invention.

The gas regulator of FIG. 1 includes a housing comprising a gas flow section 10, a gasket 11 and a cover 12 with a diaphragm 13 clamped therebetween in a pressure chamber 14 forming zones 15, 16. The diaphragm may be reinforced with a metal plate 19 and carries a valve member 20 for controlling flow through the throat 21. A plate 22 closes the passage 23 in which the valve member moves. An opening 24 provides communication between the downstream side of the gas flow path and the zone 16 of the pressure chamber. A spring 27 may be positioned in the cover 12 in engagement with the diaphragm for biasing the valve toward the open condition. A vent fitting 28 is threadedly mounted in an exhaust opening 29 which communicates with the zone 15 of the pressure chamber.

The position of the diaphragm 13, and hence the position of the valve member 20 and the size of the opening at the throat 21, under steady state conditions is a function of the atmospheric pressure, the force exerted by the spring 27, and the pressure at the downstream side of the throat. The flow passages 24 and 29 are ordinarily of a size which does not restrict gas flow and hence do not affect the rate of change of the diaphragm to a new position when pressure conditions change. However, it is customary to limit the size of the flow passage through the vent fitting to provide a maximum rate of flow of gas into or out of the zone 15 and hence limit the rate of change of position of the diaphragm. In a typical commercial product, a series of fittings 28 will be available with various sizes of openings therethrough.

The structure of FIGS. 2, 3 and 4 shows a vent flow control fitting which provides for slow opening and fast closing of the valve or a slow intake and fast exhaust of gas from the zone 15 of the pressure chamber. A seat 32, a flapper 33 and a gasket 34 are stacked in an opening 35 of the fitting 28. A cover 36 is fixed in an opening 37 of the vent fitting, as by spinning over the edge of the fitting as shown at 38. The cover serves to clamp the gasket, flapper and seat in place and also provides a mechanical protection therefor. The thickness of the gasket, flapper and seat, and the depth of the opening 35 are closely controlled to control the clamping pressure exerted on the flapper and seat by the cover 37.

An opening 41 is provided in the seat 32 and is aligned with the flow passage 42 through the vent fitting. An opening 43 is provided in the flapper 33 in alignment with the opening 41 of the seat. Another opening 44 is provided in the flapper out of alignment with the opening 41 of the seat.

The components of the fitting are normally in the position shown in FIGS. 2 and 3. When pressure decreases in the zone 16 of the pressure chamber, the diaphragm 13 tends to move downward requiring an inflow of air from the atmosphere through the vent fitting. This inflowing air urges the flapper 33 against the seat 32 so that all of the incoming air passes through the opening 43 of the flapper. Hence the size of the opening 43 controls the rate of inflow of air and hence the rate of opening of the valve. Under the reverse conditions with the diaphragm tending to move upward, air must be exhausted from the zone 15. Outflowing air moves the flapper 33 upward away from the seat exposing the opening 44 of the flapper for flow therethrough. The rate of outflow of air will be limited by the larger of the opening 41 or the combined openings 43, 44. Hence it is seen that this structure provides for a slow inflow and fast exhaust or slow valve opening and fast valve closing.

In a typical structure, the seat, flapper and gasket will be one quarter of an inch in diameter with the opening 41 of the seat 0.030 inch diameter, the opening 44 of the flapper 0.0135 inch diameter, and the opening 43 of the flapper in the range of 0.005 to 0.009 inch diameter. With such an arrangement, a wide range of rate of inflow and rate of outflow and differential between inflow and outflow rates can be obtained by choosing appropriate sizes for the openings in the flapper.

The regulator valves normally operate at relatively low pressure differentials and relatively low rates of flow. Hence the flapper design and construction must be extremely sensitive in order to produce the desired operating results. It has been found that the flapper preferably should be a quite thin member which is flexible but relatively non-elastic. The seat preferably is of a flexible material which will produce a tight sealing engagement with the flapper but which is relatively stiff compared with the flapper. A preferred material for the flapper is a polyester plastic film, such as Mylar, in the order of one-quarter mil thick. The size of the openings through the flapper has to be closely controlled in order to provide commercial units with reproducible and consistent performance. Hence the plastic film must be tough and durable even though flexible and deflectable. The choice of material and size for the seat is not critical. Typically, the seat may comprise a nylon or synthetic rubber in the range of five to ten thousands of an inch thick.

An alternative construction is shown in FIGS. 5 and 6 for providing a fast inflow and slow exhaust or fast valve opening and slow valve closing function. The seat and gasket are interchanged in the stack, placing the seat above the flapper. Then exhaust flow urges the flapper against the seat in sealing engagement limiting exhaust flow through the central opening 50 of the flapper. Inflow moves the flapper away from the seat, permitting flow through the central opening and through the additional openings 51. In the particular embodiments shown herein, the opening 44 of the FIG. 4 flapper and the opening 50 of the FIG. 6 flapper are the same size. The unit of FIG. 4 may be referred to as a slow open and normal close valve control fitting and the unit of FIG. 6 referred to as a fast open and normal close fitting.

Referring again to the embodiment of FIG. 4, it should be noted that the rate of inflow is limited by the size of the opening 43 and the rate of exhaust is limited by the combined sizes of the openings 43 and 44. However, other arrangements for limiting rate of flow may be utilized. For example, the sizes of the openings may be chosen such that the rate of exhaust is limited by the opening 41, or even by the passage 42 in the fitting itself.

Of course, a plurality of openings may be used in place of the opening 44, such as is shown in the embodiment of FIG. 6. As another example, additional openings may be provided in the seat, with the opening 41 of the seat smaller than the opening 43 of the flapper. Then the rate of inflow will be limited by the opening 41 of the seat and the rate of exhaust will be limited by the size of the combination of openings in the seat or openings in the flapper, whichever is smaller. With such an arrangement, only a single opening in the flapper is necessary. These same variations may be used with the fast open and slow close fitting.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a vent flow control fitting for a gas regulator valve having a diaphragm dividing a pressure chamber into zones, with one zone connected to a pressure reference through the vent fitting, the combination of:
    a housing;
    a gasket;
    a seat of a flexible material a few thousandths of an inch thick and having a flow passage therethrough;
    a flapper member of a flexible and relatively nonelastic material a fraction of a thousandth of an inch thick and having a first opening and at least one second opening therethrough; and
    means for clamping said flapper member at its periphery in said housing between said gasket and seat in sealing engagement, with the first opening of said flapper member aligned with the passage of said seat so that flow through said fitting in one direction urges said flapper member against said seat closing said second opening and flow in the opposite direction deflects said flapper member away from said seat clearing said second opening.

2. In a vent flow control fitting for a gas regulator valve having a diaphragm dividing a pressure chamber into zones, with one zone connected to a pressure reference through the vent fitting, the combination of:
    a housing;
    a gasket;
    a seat of a flexible material a few thousandths of an inch thick and having a flow passage therethrough;
    a flapper member of a flexible and relatively nonelastic material a fraction of a thousandth of an inch thick and having a first opening and at least one second opening therethrough; and
    means for clamping said flapper member at its periphery in said housing between said gasket and seat in sealing engagement, with the first opening of said flapper member aligned with the passage of said seat and with said flapper member on the exhaust side of said seat so that flow in through said fitting urges said flapper member against said seat closing said second opening and exhaust flow urges said flapper member away from said seat clearing said second opening, with the rate of inflow limited by said first opening to a relatively small value to provide slow opening operation.

3. In a vent flow control fitting for a gas regulator valve having a diaphragm dividing a pressure chamber into zones, with one zone connected to a pressure reference through the vent fitting, the combination of:
    a housing;
    a gasket;
    a seat of a flexible material a few thousandths of an inch thick and having a flow passage therethrough;
    a flapper member of a flexible and relatively nonelastic material a fraction of a thousandth of an inch thick and having a first opening and a least one second opening therethrough; and means for clamping said flapper member at its periphery in said housing between said gasket and seat in sealing engagement, with the first opening of said flapper member aligned with the passage of said seat and with said seat on the exhaust side of said flapper member so that exhaust flow through said fitting urges said flapper member against said seat closing said second opening and inflow urges said flapper member away from said seat clearing said second opening, providing a higher rate of flow in for fast opening operation.

References Cited in the file of this patent

UNITED STATES PATENTS

| | | |
|---|---|---|
| 236,719 | Renton | Jan. 18, 1881 |
| 2,391,211 | White | Dec. 18, 1945 |
| 2,937,658 | Stewart | May 24, 1960 |